April 12, 1960
A. C. EISENHART
2,932,750
VERTICAL ELECTRIC MOTOR HOUSING
Filed Nov. 14, 1957
2 Sheets-Sheet 1
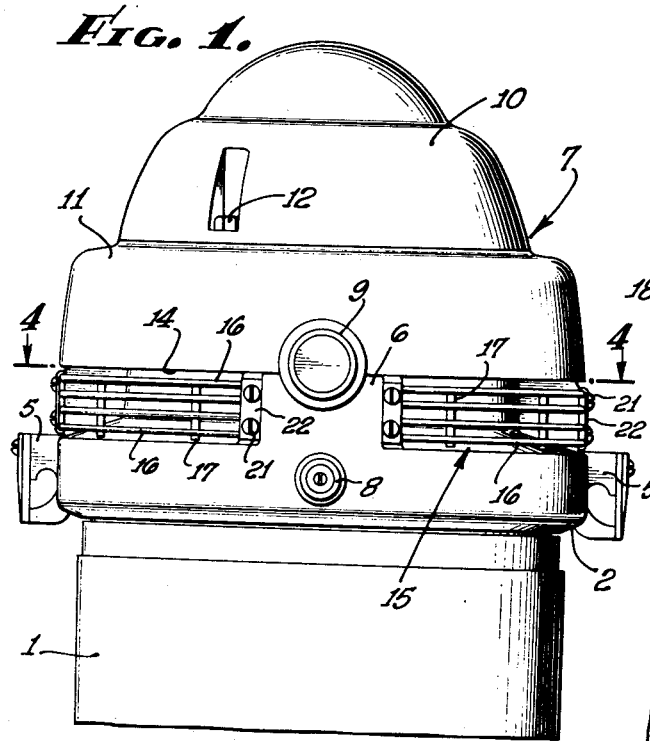
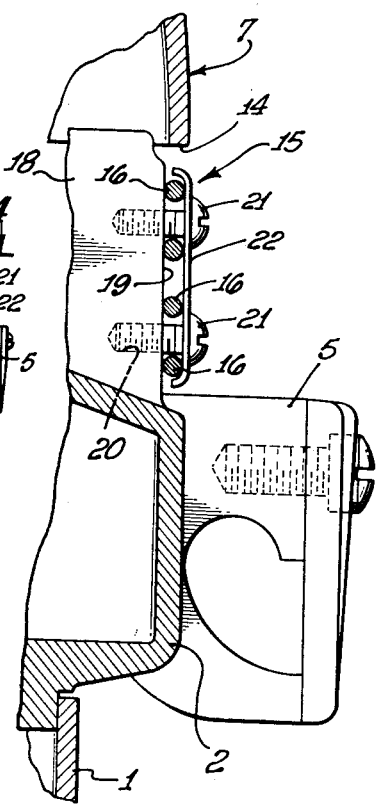
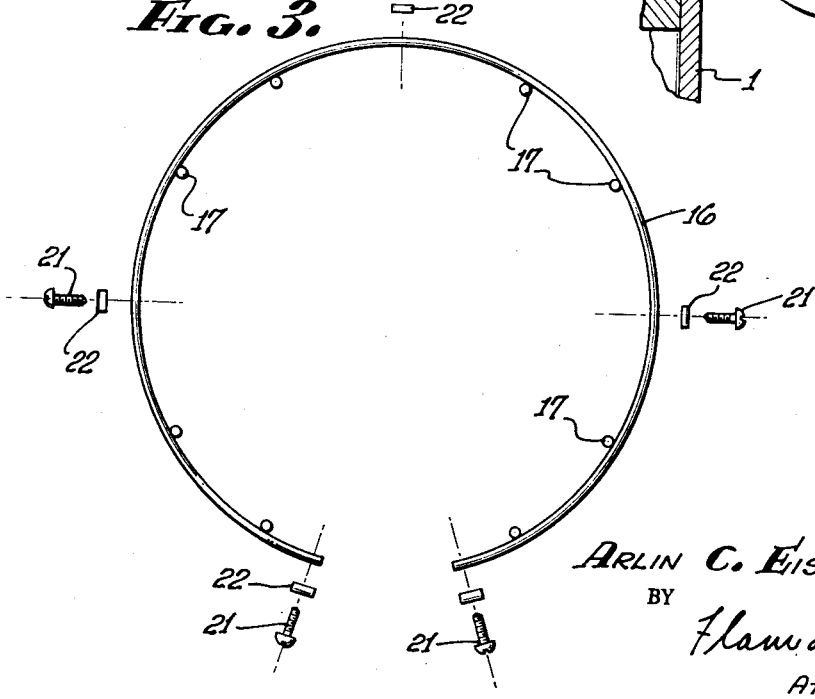
INVENTOR.
ARLIN C. EISENHART,
BY
Flame and Flame
ATTORNEYS.

April 12, 1960   A. C. EISENHART   2,932,750
VERTICAL ELECTRIC MOTOR HOUSING
Filed Nov. 14, 1957   2 Sheets-Sheet 2

INVENTOR.
ARLIN C. EISENHART,
BY
Flam and Flam
ATTORNEYS.

United States Patent Office 2,932,750
Patented Apr. 12, 1960

2,932,750

VERTICAL ELECTRIC MOTOR HOUSING

Arlin C. Eisenhart, Fullerton, Calif., assignor to U.S. Electrical Motors, Inc., Los Angeles, Calif., a corporation of California Application November 14, 1957, Serial No. 696,492

2 Claims. (Cl. 310—89)

This invention relates to electrical motors, and particularly to vertical motors for operating underground pumps in wells.

Such motors as now commonly employed, usually employ a casing for the motor parts proper, and a cover above the casing. Underneath the cover there are provisions for adjusting the shaft driven by the motor so as to position the pump runners carried by the shaft, for optimum results.

It is one of the objects of this invention to improve in general the enclosure for such motors.

It has been common to provide an air space between the casing structure and the cover, to permit air circulation to and from the interior of the casing. It is another object of this invention to provide an adequate air opening, and yet to ensure against the ingress of foreign matter.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of the invention is best defined by the appended claims.

Referring to the drawings:

Figure 1 is a fragmentary elevation of a vertical motor structure embodying the invention;

Fig. 2 is a fragmentary enlarged vertical section, showing details of construction relating to the invention;

Fig. 3 is a plan view, mainly diagrammatic, of a grill structure incorporating the invention;

The vertical electric motor in which the invention is embodied is provided with a substantially cylindrical casing 1. This casing houses the usual parts, such as the stator and rotor of an electric motor.

Figure 4:
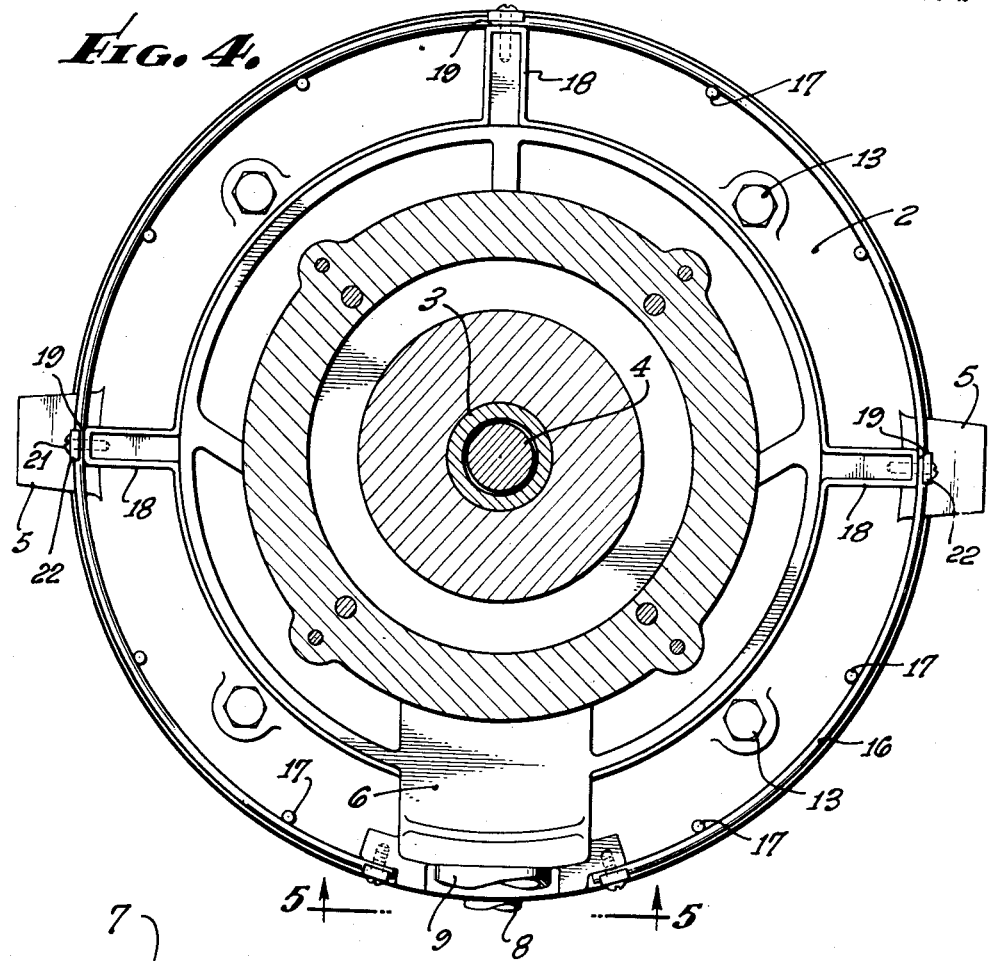
Fig. 4 is a sectional view taken along a plane corresponding to line 4—4 of Fig. 1.
Figure 5:
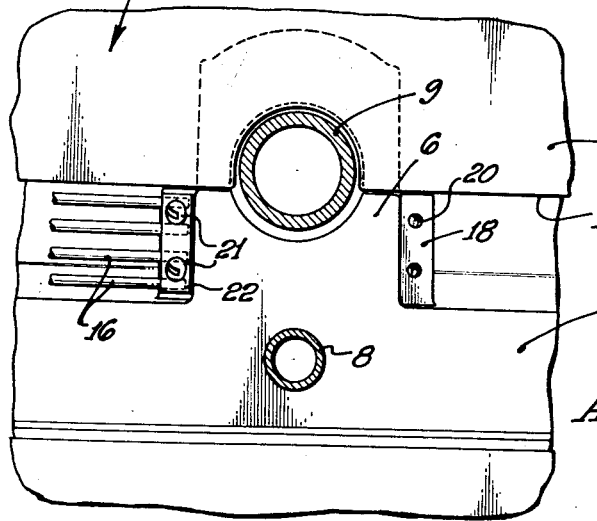
Fig. 5 is an enlarged fragmentary view taken from a plane corresponding to line 5—5 of Fig. 4, some of the parts being omitted for the sake of clarity.

Above the casing 1 is a bearing bracket 2 having upper and lower concentric portions (Figs. 1 and 4) joined by a step or shelf that slopes downwardly in an outward direction. The lower bracket portion has a diameter somewhat larger than the diameter of the casing 1, and providing a bearing support for the hollow shaft 3 (Fig. 4). This shaft is driven by the electric motor. The pump shaft 4 is telescoped therein. Such hollow shaft structures are well-known, and further description thereof is unnecessary.

At diametrically opposite sides of the bearing bracket 2, there are disposed hooks 5 for the accommodation of lifting cables. A hollow boss 6 (see particularly Fig. 4) is provided on the bearing bracket 2 to form an inlet for a lubricant well. This well is also provided with a drain structure 8 and a lubricant level indicator 9.

Vertically spaced above the bracket 2 is a cover structure 7 (Fig. 1). This cover structure 7 is appropriately attached to the upper portion of the bearing bracket 2; said upper portion being within the cover structure 7.

The cover structure 7 has a lower portion 11 and an upper portion 10. Portion 10 is in the form of a detachable canopy-like member attached to the lower portion 11, as by the aid of a number of screws 12.

Bolts 13 pass through the base of bracket 2 for holding it firmly in place with respect to the casing 1.

The lower edge 14 (Fig. 2) of the canopy 10 is spaced from the base or lower portion of the bracket 2 and accordingly there is a relatively wide opening 15 defined by this edge 14. The opening 15 forms an inlet or outlet for cooling air which enters and leaves via the opening. Since the opening 15 extends to the outer periphery of the base portion 11 and the bracket 2, the area of the opening is quite large and the velocity of the incoming and outgoing air is consequently reduced.

In order to prevent the entry of foreign matter, such as rodents, birds, and the like through the opening 15, a grill structure is provided. The grill includes, in this instance, four circularly bent bars 16 disposed one above the other in parallel relation and joined together as by a number of vertical bars 17. These transverse bars 17 may be welded to the inner sides of the spaced parallel bars 16.

These bars extend around the structure, to the opposite edges of the boss 6. They are held in place by the aid of vanes 18 (see particularly Fig. 4), formed integrally with bearing bracket 2 extending radially of the upper bracket portion along the intermediate step or shelf. A pair of these vanes laterally adjoin the boss 6; the others are distributed around the outer edges of the bracket 2. Each of them has an edge 19 facing outwardly at the opening 15. The edges 19 of the vanes 18 are located slightly inwardly of the upward cylindrical projection of the lower bracket wall portion. The vanes adjoining the boss 6 form with the boss steps receiving the ends of the grill bars 16. As shown in Fig. 2, the thickness of the bars 16 corresponds to the inward spacing of the vane edges 19. Accordingly, the bars 16 neither project beyond the bracket 2 nor are they recessed therein more than their thickness. The bars 16 are thus so located that they are protected from entanglement or damage in use or transportation. In each of the vane edges there are provided tapped apertures 20 for the accommodation of machine screws 21 (Fig. 2). These machine screws 21 pass through apertures in clamping clips 22 shown to best advantage in Fig. 2. The screws pass between the bars 16 and firmly hold the grill structure in place around the opening 15.

The inventor claims:

1. In a vertical electric motor having a casing: a bearing bracket for the upper end of said casing and having a peripheral circularly extending wall, the lower portion of which is of a diameter in excess of the diameter of an upper concentric portion thereof, said portions forming between them a step or shelf; a plurality of angularly spaced vanes extending radially from the upper wall portion and along the step; the vanes having radially outwardly facing surfaces located slightly inwardly of the outer boundary of said lower bracket wall portion; a grill comprising a plurality of circularly extending spaced parallel bars engaging said outwardly facing vane surfaces; a plurality of clips detachably cooperable with the vanes and clamping said bars against said vane surfaces;

the thickness of the bars corresponding to the inward spacing of said vane surfaces; and a hollow cover detachably secured to said bracket, and having a flange fitting over the upper portions of said vane surfaces, the diameter of said flange corresponding substantially to that of the said lower wall portion, and whereby a substantially circularly extending protected opening into said bracket is formed without requiring a close overhanging relationship between said cover and said bracket.

2. The combination as set forth in claim 1, in which said bracket includes a hollow boss for lubricant or the like which extends from said upper wall portion outwardly to adjoin said lower wall portion; two of said vanes being disposed at the sides of said boss to provide steps; the circular grill having ends fitting the respective steps; the boss except for the steps being upwardly contiguous with said lower wall portion.

References Cited in the file of this patent

UNITED STATES PATENTS

| | | |
|---|---|---|
| 1,497,513 | Kelley | June 10, 1924 |
| 1,972,315 | Ramey | Sept. 4, 1934 |
| 2,594,003 | Else | Apr. 22, 1952 |
| 2,725,343 | Stiglmeier | Dec. 6, 1955 |

FOREIGN PATENTS

| | | |
|---|---|---|
| 4,928 | Great Britain | of 1909 |
| 461,218 | Great Britain | Feb. 12, 1937 |
| 832,635 | Germany | Feb. 28, 1952 |